3,159,590
POLYMERIC ORGANOBORON COMPOUNDS

Robert J. Brotherton, Fullerton, and Lowell L. Petterson, Whittier, Calif., assignors to United States Borax & Chemical Corporation, Los Angeles, Calif., a corporation of Nevada
No Drawing. Filed Mar. 20, 1962, Ser. No. 181,159
6 Claims. (Cl. 260—2)

The present invention relates as indicated to a new class of polymeric organoboron compounds, and has further reference to means for preparing these polymeric compounds.

It is, therefore, the principal object of the present invention to provide a new class of thermally stable organoboron polymers.

It is a further object of this invention to provide efficient means for preparing these new thermally stable polymers.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises organoboron polymers having the recurring structural unit

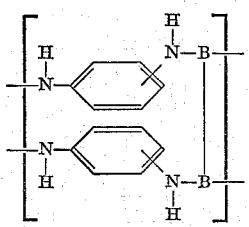

where the boryl-amino substituents can only be in the meta and para positions.

The organoboron polymers of the present invention have utility as molding and casting resins. These compounds exhibit a high degree of thermal stability at temperatures of over 500° C. and they have many industrial applications, for example as protective coatings for different types of wire and glass-cloth, which are to be subjected to high temperature environments.

The preparation of the present organoboron polymers can best be illustrated by the following equation:

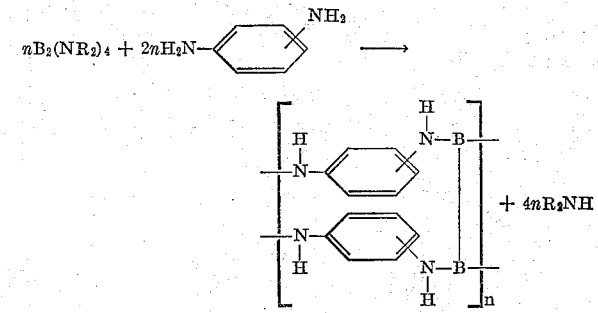

where R is either a primary or a secondary alkyl radical of from 1 to 6 carbon atoms, where the amine is meta- or para-phenylenediamine and where $n$ is an integer greater than 1.

The preferred method for performing the above polymerization reaction is a direct single-step process. The reactants, p-phenylenediamine or m-phenylenediamine and a tetra(dialkylamino)diboron compound are added together, in about a 2:1 molar ratio, in the presence of an inert solvent. The reaction mixture is then heated under reflux until substantially all of the dialkylamine produced by the reaction is removed. The desired polymeric organoboron compound is then recovered from the residual reaction mass.

The reactants applicable to the present invention are p-phenylenediamine or m-phenylenediamine and the tetra-(dialkylamino)diborons. The p- and m-phenylenediamines are well known in the art, and they are presently commercially available materials.

The tetra(dialkylamino)diboron compounds applicable to the present invention have the formula $B_2(NR_2)_4$, where R is either a primary or a secondary alkyl radical of from 1 to 6 carbon atoms. Reference to the tetra-(dialkylamino)diborons and means for their preparation can be found in the Brotherton, et al., U.S. Patent No. 2,974,165. The following list is illustrative of these compounds:

Tetra(dimethylamino)diboron
Tetra(diethylamino)diboron
Tetra(di-n-propylamino)diboron
Tetra(diisopropylamino)diboron
Tetra(di-n-butylamino)diboron
Tetra(diisobutylamino)diboron
Tetra(di-n-amylamino)diboron
Tetra(diisoamylamino)diboron
Tetra(di-n-hexylamino)diboron The solvents applicable to the invention must be inert to the present reactants, and should have a boiling point greater than that of the dialkylamine reaction product to facilitate the separation of the dialkylamine from the reaction mass. Most of the common hydrocarbon solvents and ethers are suitable for this purpose. The following list is illustrative of such compounds:

Benzene
Toluene
Chlorobenzene
Xylene
Octane
Decane
Dodecane
Dibutylether
Diethyleneglycol dimethyl ether
Tetraethyleneglycol dimethyl ether It is to be clearly understood that the foregoing lists of compounds are only a partial enumeration of the compounds applicable to the present invention, and are not intended to limit the invention.

So that the present invention can more clearly be understood, the following examples are given for illustrative purposes:

I

Tetra(dimethylamino)diboron, 13.29 grams (67 mmoles), was added to 14.49 grams (134 mmoles) of p-phenylenediamine in 350 ml. of benzene in a 1-liter, round-bottomed flask equipped with a reflux condenser and a nitrogen inlet, and attached to a trap containing a standard aqueous acid solution. A slow stream of nitrogen was passed over the reaction mixture which was heated under reflux for about 48 hours, at which time 226 mmoles (84.3% of theory) of dimethylamine had been swept into the acid solution. The resultant reaction mass was allowed to cool and was then filtered. The filter cake was recovered and dried at about 110° C. under vacuum to yield a brown, solid resin. This resin when heated at 500° C. lightened in color, but otherwise remained unchanged. Chemical analysis of the polymeric product yielded the following data:

Calculated for $C_{12}H_{12}B_2N_4$: Percent B=9.25. Found in product: Percent B=8.87.

II

Tetra(diisopropylamino)diboron, 30.5 grams (72 mmoles), was added to 15.57 grams (144 mmoles) of p-phenylenediamine in 400 ml. of xylene in a 1-liter, round-bottomed flask equipped with a reflux condenser and a nitrogen inlet, and was attached to a trap containing a standard aqueous acid solution. A slow stream of nitrogen was passed over the reaction mixture which was heated under reflux for about 48 hours, at which time 251 mmoles (86.5% of theory) of diisopropylamine had been swept into the acid solution. The resultant reaction mass was allowed to cool and was then filtered. The filter cake was recovered and dried under vacuum at about 110° C. to yield a tan, solid resin. This resin remained unaffected when heated at about 500° C. Chemical analysis of the polymeric product yielded the following data:

Calculated for $C_{12}H_{12}B_2N_4$: Percent B=9.25. Found in product: Percent B=8.93.

III

Tetra(dimethylamino)diboron, 13.29 grams (67 mmoles), was added to 14.49 grams (134 mmoles) of m-phenylenediamine in 350 ml. of benzene in a 1-liter, round-bottomed flask equipped with a reflux condenser and a nitrogen inlet and was attached to a trap containing a standard aqueous acid solution. A slow stream of nitrogen was passed over the reaction mixture which was heated under reflux for about 52 hours, at which time 232 mmoles (86.6% of theory) of dimethylamine had been swept into the acid solution. The resultant reaction mass was allowed to cool and was then filtered. The filter cake was recovered and dried at about 110° C. under vacuum to yield a tan, solid resin. This resin when heated to 500° C. changed from tan to yellow, but did not melt or char. Chemical analysis of the polymeric product yielded the following data:

Calculated for $C_{12}H_{12}B_2N_4$: Percent B=9.25. Found in product: Percent B=8.82.

Other modes of applying the principle of the invention may be employed, change being made as regards the details described, provided the features stated in any of the following claims or the equivalent of such be employed.

We, therefore, particularly point out and distinctly claim as our invention:

1. Solid, thermally stable organoboron polymers consisting of the recurring structural unit

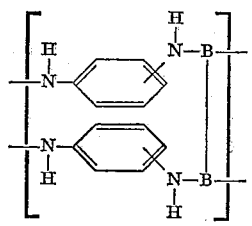

where the boryl-amino substituents can only be in the meta and para positions,

2. A solid, thermally stable organoboron polymer consisting of the recurring structural unit

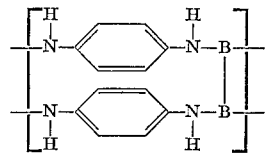

3. A solid, thermally stable organoboron polymer consisting of the recurring structural unit

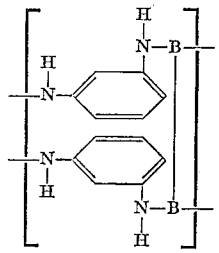

4. The method for preparing solid, thermally stable organoboron polymers consisting of the recurring structural unit

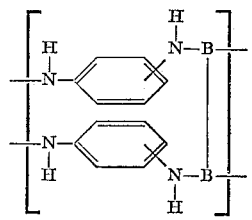

which comprises heating under reflux, in about a 2:1 molar ratio, a material selected from the group consisting of p-phenylenediamine and m-phenylenediamine and a tetra(dialkylamino)diboron compound having the formula $B_2(NR_2)_4$, where R is selected from the group consisting of primary and secondary alkyl radicals of from 1 to 6 carbon atoms, in the presence of a solvent inert to said reactants, removing dialkylamine produced in the reaction, and separating the desired polymeric organoboron compound from the residual mass.

5. The method for preparing solid, thermally stable organoboron polymers consisting of the recurring structural unit

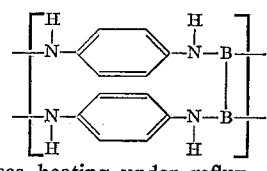

which comprises heating under reflux, in about a 2:1 molar ratio, p-phenylenediamine and a tetra(dialkylamino)diboron compound having the formula $B_2(NR_2)_4$, where R is selected from the group consisting of primary and secondary alkyl radicals of from 1 to 6 carbon atoms, in the presence of a solvent inert to said reactants, removing dialkylamine produced in the reaction, and separating the desired polymeric organoboron compound from the residual mass.

6. The method for preparing solid, thermally stable organoboron polymers consisting of the recurring structural unit

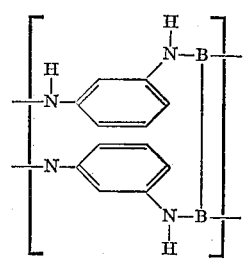

which comprises heating under reflux, in about a 2:1 molar ratio, m-phenylenediamine and a tetra(dialkylamino)diboron compound having the formula $B_2(NR_2)_4$, where R is selected from the group consisting of primary and secondary alkyl radicals of from 1 to 6 carbon atoms, in the presence of a solvent inert to said reactants, removing dialkylamine produced in the reaction, and separating the desired polymeric organoboron compound from the residual mass.

References Cited in the file of this patent

UNITED STATES PATENTS 3,053,777    Goldschmid _____ Sept. 11, 1962